Figure 6:
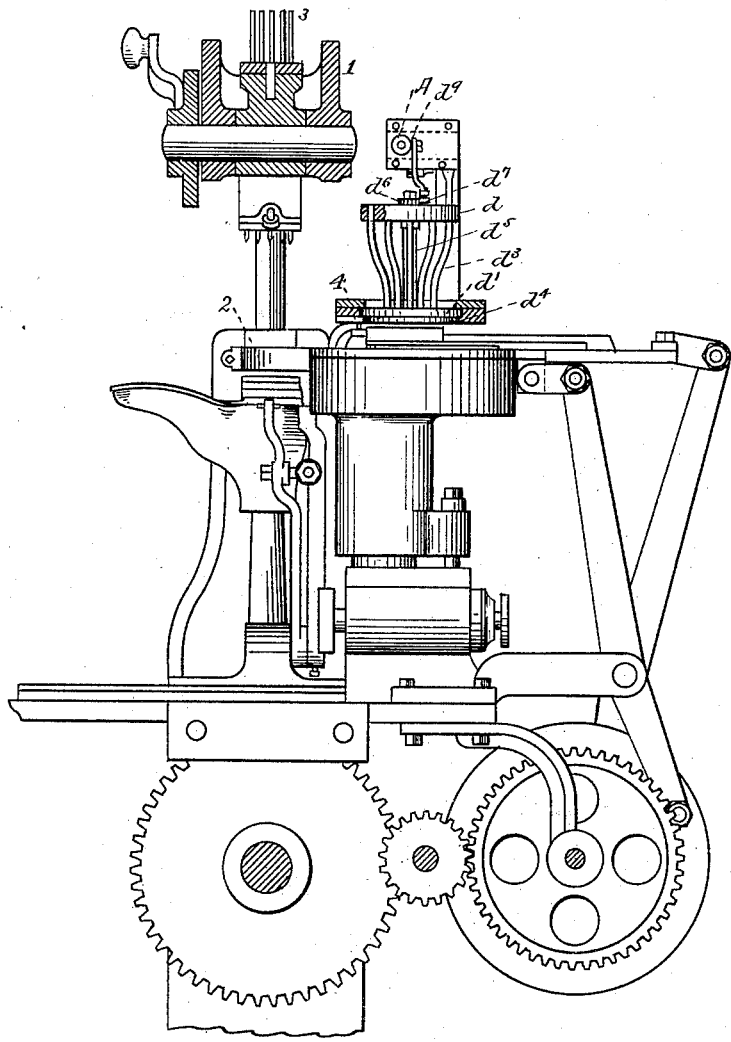

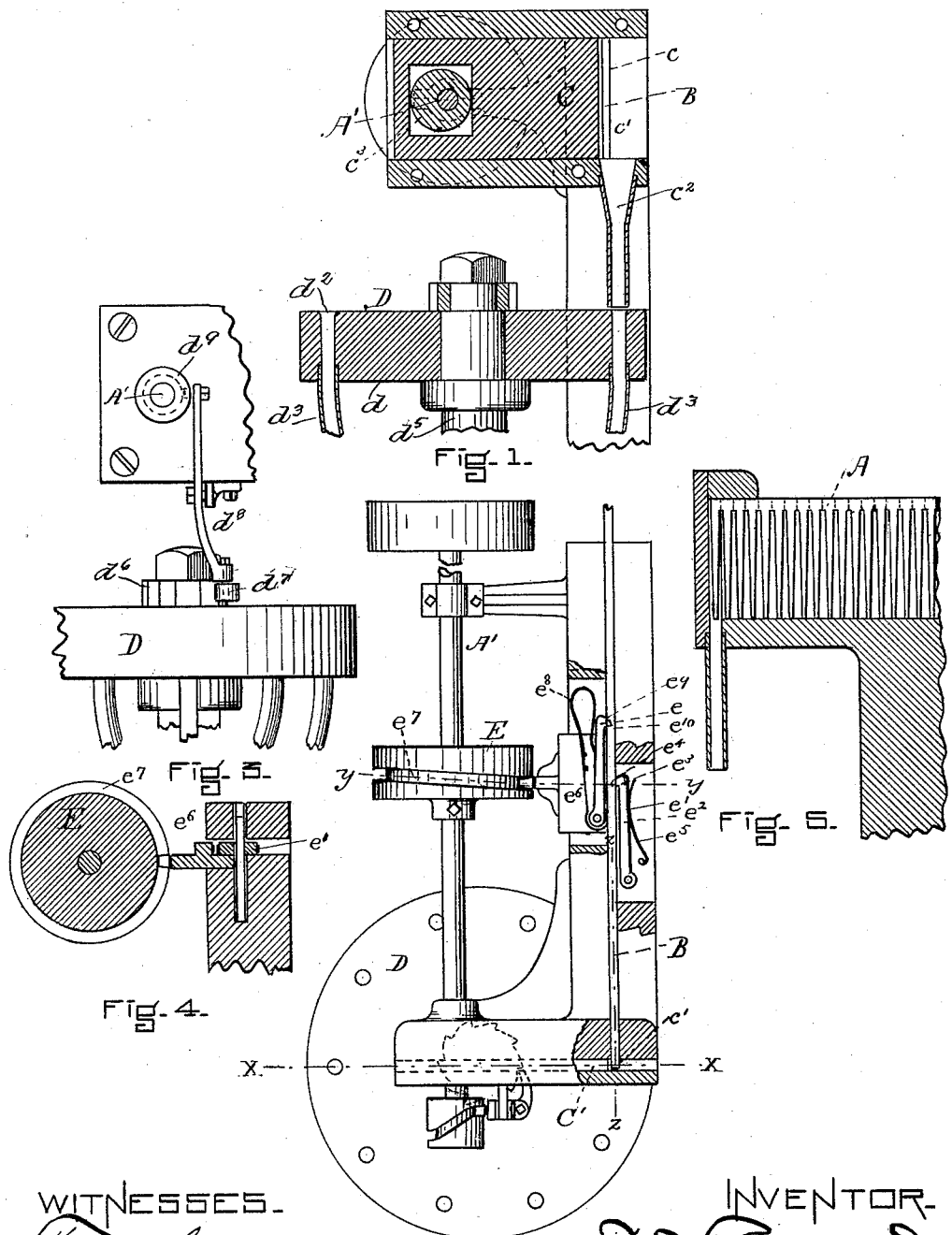

(No Model.)  F. F. RAYMOND, 2d.  3 Sheets—Sheet 2.
HEEL NAILING MACHINE.

No. 331,441.  Patented Dec. 1, 1885.

(No Model.)   F. F. RAYMOND, 2d.   3 Sheets—Sheet 3.
HEEL NAILING MACHINE.
No. 331,441.   Patented Dec. 1, 1885.
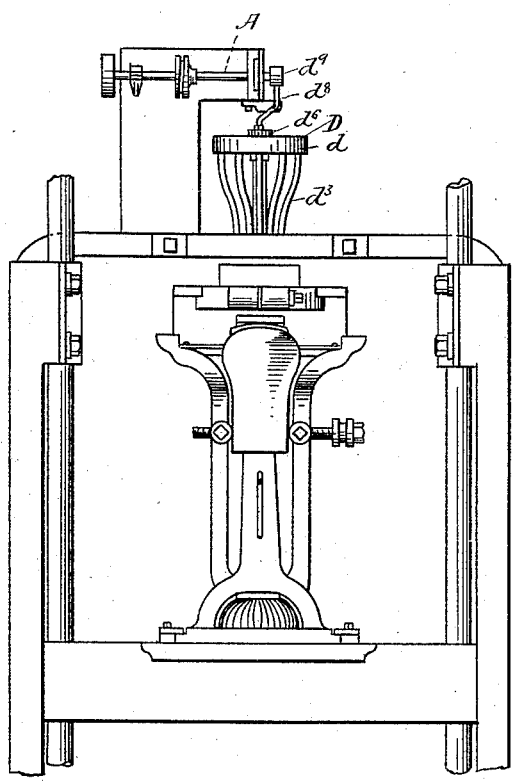
Fig- 7-

UNITED STATES PATENT OFFICE.

FREEBORN F. RAYMOND, 2D, OF NEWTON, MASSACHUSETTS.

HEEL-NAILING MACHINE.

SPECIFICATION forming part of Letters Patent No. 331,441, dated December 1, 1885.

Application filed January 17, 1885. Serial No. 153,159. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Heel-Making and Heel-Attaching Machines, of which the following is a full, clear, and exact description, reference being had to the accompanying drawings, forming a part of this specification, in explaining its nature.

The invention is an improvement upon that described in my application for Letters Patent filed July 17, 1884, Serial No. 137,980. In said application I have described an organized heel-nailing machine having a nail making and feeding attachment; and the present invention relates especially to this part of the invention, and in lieu of the devices for making the nail from wire as therein described I have substituted appliances for making the nail from what is known as a "comb-strip," and for feeding it automatically to the distributer.

Referring to the drawings, Figure 1 is a vertical section upon the line $x\ x$ of Fig. 2. Fig. 2 is a plan view of the machine. Fig. 3 is an end elevation. Fig. 4 is a vertical section on the line $y\ y$ of Fig. 2, and Fig. 5 is a vertical section on the line $z\ z$ of Fig. 2. Fig. 6 represents, part in vertical section and part in side elevation, a National heeling-machine with my improvement; and Fig. 7 is a front elevation thereof, the cross-head having been removed.

A is the nail-strip. It comprises a series of shanks formed like ordinary shoe-nails with two inclined surfaces and two parallel sides, which extend from an uncut portion of the nail-plate. This nail-plate is fed automatically to a severing device, which completes the nails successively by cutting them from the strip, and feeds them into a position to enter the distributer.

A' is a shaft of the machine, which is revolved in any desirable manner, and is equivalent to the main shaft of the nail-making devices of my said application.

B is the feedway of the machine.

C is the nail-cutter or severing device. It is in substance a reciprocating punch, and it plays across the end of the feedway and shears off the nails as they are fed forward beyond the edge $c$ of the passage $c'$, connecting the end of the feedway with the vertical passage $c^2$. This punch or cutting device is operated by the eccentric $c^3$ upon the shaft A'. The passage into which the severed nail is moved by the punch or cutting device opens into the passage which connects with the revolving distributer D, described in my said application. This distributer D comprises the circular disk $d$ and a nail-holder, $d'$, and there are formed in the disk D holes $d^2$, which are arranged a uniform distance apart and upon a circular line, and in the nail-holder $d'$ a like number of holes, which are not arranged upon a circular line, but to conform to the line upon which the nails are to be driven into the heel-blank, and this line is substantially parallel with the edge of the heel-blank. These holes are connected with each other by tubes $d^3$, so that the nails fed or dropped into the holes $d^2$ will pass by gravity through the same and their connecting-tubes to the nail-holder. The nail-holder is closed by a sliding plate, $d^4$, which is moved to close the holes automatically by a spring, (not shown,) and is opened automatically to release the nails, as hereinafter specified; and the nail-holder is arranged to revolve with the disk, being secured thereto by the post $d^5$. The distributer is revolved by the ratchet $d^6$, the pawl $d^7$ on the lever $d^8$, and the cam $d^9$ upon the shaft A'. Each hole of the disk is brought successively in line with the throat or passage $c^2$ to receive a nail severed from the nail-strip by the punch C'. The distributer thus makes a complete revolution, receives a nail for each hole, and is then automatically stopped, as described in my said application, or in any other equivalent manner. The nail-holder is thus filled with nails, and as the nail feeding and severing devices are started immediately after the nail-carrier has taken a load of nails from the nail-holder, and slightly advanced, it follows that the nail-holder has always a load of nails to deliver the nail-carrier upon its backward movement, as hereinafter shown, and as described in my said application.

1 is the cross-head of the heel-attaching machine; 2, the templet, and 3 the gang or group of drivers. This portion of the machine is like that described in Letters Patent to Henderson, No. 252,215, and in his application filed January 10, 1883.

In the operation of attaching a heel the nail-holder is moved to deliver its load of nails to the templet. The drivers are then reciprocated and the nails driven into the heel. The carrier is immediately moved backward, and upon its reverse movement a pin, 4, comes in contact with the sliding plate of the nail-holder, moves it back and opens the holes of the nail-holder, when they are in line with the holes in the carrier, and the nail-holder thus delivers its load to the nail-carrier. Immediately upon receiving the load the nail-carrier is moved forward a short distance, and the nail-plate and feeding and severing devices immediately set in motion by means specified in my said application of July 17, 1884, and the holder again supplied with nails before the nail-carrier has been advanced to again deliver its load.

The nail-blank-feeding mechanism comprises two feed-pawls, $e\ e'$, one of which, $e'$, is a dead one or detent, and the other a reciprocating one. The stationary pawl is attached to the wall of the feedway, and has an arm, $e^2$, by which it is pivoted. The pawl projects through a hole in the wall into the feedway, and has the shoulder $e^3$ upon one side and the incline $e^4$ upon the other. A spring, $e^5$, bears against it, and it is so hinged or secured that upon the forward movement of the strip in feeding the detent is pressed back sufficient to allow the passage of a nail-shank, and after such passage it automatically returns between the shank that is passed and the next following, the square portion of the shoulder shutting behind the shank and preventing the nail-strip from being moved back during the operation of the severing mechanism or reverse movement of the feed-pawl. This feed-pawl $e$ is mounted upon a block, $e^6$, which is reciprocated by the cam-groove $e^7$ in the cylinder E. The pawl is hinged to such sliding block, and is kept in constant contact with the shanks of the nail-strip by the spring $e^8$. It has the inclined surface $e^9$ and a straight shoulder, $e^{10}$, so arranged that upon the reverse or outward movement of the block the pawl rides over the shanks, but upon the forward or feeding movement it catches onto them or engages with them and feeds the strip forward. Of course any other suitable feed mechanism may be employed. I prefer that the opening from the die to the passage to the distributer be enlarged, as represented in Fig. 1, and extended backward, so that there shall be no surface in front of the punch upon which the nail can catch in its downward movement. The distributer is revolved by a ratchet-pawl, lever, and cam, substantially as shown and described in my application, the only exception being that the cam is on a shaft operating the reciprocating punch and pawl-feed instead of upon the shaft of the nail-making device of said application. It is of course essential that the device be started and stopped at the intervals mentioned in said application, and the mechanism which I have described and claimed in said application for accomplishing this object can be used in connection with this device.

The invention, it will be observed, provides a cheap, simple, easy and sure method of making and delivering heel-nails to a distributer of a heel making or attaching machine.

In operation the comb-strip is inserted into the feedway and fed by the feeding device automatically to the cutter, which cuts at each reciprocation a nail from the end of the strip and moves it into a position to drop through the feed-passage to the distributer. The distributer is timed to present its passage successively to the end of the feed-passage and the nails are then fed to the nail-holder, which is like that described in said patent application, and from there the nails are delivered to the heel-blank or carrier.

It will be seen that the invention herein described comprises the combination of elements whereby a comb-strip of heel-nails is automatically fed, the nails separated or severed therefrom and automatically distributed into a nail-holder, in a form and arrangement to be received by a nail-carrier simultaneously, and to be transferred or carried to a position to be driven by the nail-driving devices, and that the elements for carrying this into effect are the nail-plate feeding and nail-severing devices, the distributer, the carrier, and the heel-nail-driving devices.

I would state that in lieu of the comb-strip feeding and cutting or punching mechanism above described, there can be used any equivalent feeding and severing devices, the primary object of the invention being the arrangement of such devices in relation to a distributer and nail-driving device to provide the nail-machine with an automatic supply of nails cut from a comb-strip and arranged for simultaneous driving.

Having thus fully described my invention, I claim and desire to secure by Letters Patent of the United States—

1. In a machine for making or attaching heels, the combination of a bracket supporting above a distributer comb-strip-feeding mechanism, and a reciprocating punch or cutter, substantially as described, for feeding and cutting nails continuously and in regular succession, and a distributer arranged to receive the nails successively as they are severed and deposit them in a nail-holder, all substantially as specified.

2. In a machine for making or attaching heels, the combination of a bracket supporting above the distributer comb-strip-feeding mechanism, and a reciprocating punch or cutter, substantially as described, for feeding and cutting nails continuously and in regular succession, a distributer arranged to receive the nails successively as they are severed and deposit them in a nail-holder, and a nail-carrier which receives the nails in a gang or group from the nail-holder and transfers them to a position to be driven, substantially as specified.

3. In a machine for making or attaching heels, the combination of a bracket supporting above a distributer comb-strip-feeding mechanism, and a reciprocating punch or cutter, substantially as described, for feeding and cutting nails continuously and in regular succession, a distributer arranged to receive the nails successively as they are severed and deposit them in a nail-holder, a nail-carrier which receives the nails in a gang or group from the nail-holder and transfers them to a position to be driven, and nail-driving devices, all substantially as set forth.

4. In a nailing-machine, the combination of the feedway B, the reciprocating pawl $e$, the detent-pawl $e'$, the reciprocating cutter C, the cutter or die passage $c'$, the passage $c^2$, and the nail-receiving passages $d^2$, arranged to be moved successively in line with the passage $c^2$, all substantially as and for the purposes described.

5. In a heeling-machine, the combination of the feedway B, the passage $c'$, the plunger or cutter C, the passage $c^2$, and the disk or block D, having a series of holes adapted to be brought successively in line with the passage $c^2$, all substantially as and for the purposes described.

FREEBORN F. RAYMOND, 2D.

Witnesses:
   CHAS. WM. CLARKE,
   FRED. B. DOLAN.